US008689011B2

(12) United States Patent
Bauchot et al.

(10) Patent No.: US 8,689,011 B2
(45) Date of Patent: Apr. 1, 2014

(54) SYSTEM AND METHOD FOR CONTENT PROTECTION

(75) Inventors: Frederic Bauchot, Saint-Jeannet (FR); Jean-Luc Collet, La Gaude (FR); Gerard Marmigere, Drap (FR); Christophe Mialon, Vence (FR)

(73) Assignee: International Business Machines Corporation, Armonk, NY (US)

( * ) Notice: Subject to any disclaimer, the term of this patent is extended or adjusted under 35 U.S.C. 154(b) by 1096 days.

(21) Appl. No.: 12/195,598

(22) Filed: Aug. 21, 2008

(65) Prior Publication Data
US 2009/0052671 A1 Feb. 26, 2009

(30) Foreign Application Priority Data

Aug. 24, 2007 (EP) .................................... 07301324

(51) Int. Cl.
*E21B 15/04* (2006.01)

(52) U.S. Cl.
USPC ............................................ 713/193; 726/14

(58) Field of Classification Search
USPC .......................................................... 713/193
See application file for complete search history.

(56) References Cited

U.S. PATENT DOCUMENTS

| | | | |
|---|---|---|---|
| 5,796,824 A | 8/1998 | Hasebe et al. | |
| 5,920,560 A * | 7/1999 | Takahashi et al. | 370/395.7 |
| 6,853,731 B1 * | 2/2005 | Boyle et al. | 380/268 |
| 7,136,487 B1 | 11/2006 | Schon et al. | |
| 7,765,373 B1 * | 7/2010 | Merry et al. | 711/163 |
| 7,805,607 B2 | 9/2010 | Diehl et al. | |
| 2003/0074569 A1 * | 4/2003 | Yamauchi et al. | 713/189 |
| 2003/0217271 A1 | 11/2003 | Calder | |
| 2005/0234826 A1 * | 10/2005 | Ohmori et al. | 705/51 |
| 2007/0160209 A1 | 7/2007 | Kasahara et al. | |
| 2007/0223705 A1 * | 9/2007 | Kasahara et al. | 380/281 |
| 2008/0072072 A1 * | 3/2008 | Muraki et al. | 713/193 |
| 2008/0152137 A1 * | 6/2008 | Nakano et al. | 380/201 |

FOREIGN PATENT DOCUMENTS

| | | |
|---|---|---|
| EP | 1195734 A1 | 1/2001 |
| EP | 1505595 A2 | 2/2005 |
| EP | 1764697 A1 | 4/2005 |
| WO | 2006001161 A1 | 1/2006 |

OTHER PUBLICATIONS

Vipul Goyal; Attribute-Based Encryption for Fine-Grained Access Control of Encrypted Data; Year:2006; IEEE; pp. 1-26.*

(Continued)

*Primary Examiner* — Mohammad W Reza
*Assistant Examiner* — Monjour Rahim
(74) *Attorney, Agent, or Firm* — Douglas A. Lashmit; Hoffman Warnick LLC

(57) ABSTRACT

The invention provides a system and method for content protection. A system in accordance with an embodiment includes a media center connectable to a mobile master memory unit associated with an identifier, the media center including: a protection key; storage means for storing files identified by respective file identifiers; a processing unit comprising file encryption for encrypting each file before storage, using a title key computed from the protection key of the media center and for encrypting the title key using the protection key of the master storage device and the identifier of the master memory unit, the master storage device being further provided to write the encrypted title key in association with the corresponding file identifier to the master memory unit.

21 Claims, 10 Drawing Sheets

(56) References Cited

OTHER PUBLICATIONS

Intel Technology Journal, Interoperable Home Infrastructure, "Content Protection in the Digital Home", vol. 6, Issue 4, Published, Nov. 15, 2002, ISSN 1535-766X, http://developer.intel.com/technology/itj/index.htm.

Techtrends, by Brian Dipert, Technical Editor, "Media Security Thwarts Temptation, Permits Prosecution", www.ednmag.com, Jun. 22, 2000, pp. 101-118.

PCT, "Notification of Transmittal of the International Search Report and the Written Opinion of the International Searching Authority, or the Declaration", International Application No. PCT/EP2008/057346, Date of Mailing Oct. 8, 2008.

4C Entity, LLC, "Content Protection for Recordable Media Specification SD Memory Card Book Common Part", May 3, 2007, XP-002495304, pp. 1-26, URL:http://www.4centity.com.

4C Entity, LLC, "Content Protection for Recordable Media Specification SD Memory Card Book SD-SD (Separate Delivery) Part", May 15, 2007, XP-002495305, pp. 1-59, URL:http://www.4centity.com.

4C Entity, LLC, "Content Protection for Recordable Media Specification SD Memory Card Book SD-Audio Part", Feb. 22, 2007, XP-002495306, pp. 1-18, URL:http://www.4centity.com.

Reed, "Authenticating Network Attached Storage", Department of Computer Science, IBM Almaden Research Center, Jun. 6, 2003, 9 pages.

European Application No. 08 760 893.1-2212, FR920070082EP2, Office Action Communication, Apr. 10, 2010, 5 pages.

Intel Corporation, "Content Protection for Recordable Media Specification, DVD Book", Revision 0.96, XP-002991354, Jan. 31, 2003, 50 pages.

Rahim, U.S. Appl. No. 12/195,638, Office Action Communication, FR920070082US1, Apr. 28, 2011, 13 pages.

Rahim, U.S. Appl. No. 12/195,638, Office Action Communication, FR920070082US1, Nov. 2, 2012, 8 pages.

Rahim, U.S. Appl. No. 12/195,638, Office Action Communication, FR920070082US1, Jul. 18, 2013, 10 pages.

* cited by examiner

SYSTEM AND METHOD FOR CONTENT PROTECTION

FIELD OF THE INVENTION

The present invention generally relates to protection of content stored on a storage device. The invention relates more specifically to a method and system for protecting data stored on a storage device against unauthorized access or use, based on encryption of the data before storage.

BACKGROUND ART

As the volume of data stored on personal computers becomes more and more important, external mobile storage devices, having portable and large capacity storage features, are provided to serve as auxiliary storage means. Such conventional storage devices are generally referred as external hard disks, media disks or media centers, and are connectable to personal computers for data transfer between the personal computer and the external storage device. They are usually used to store personal data such as pictures, audio and video files.

As is well known, these storage devices can be directly attached to a display device or a player so as to readily display or play the data stored in the storage device, for example when the data are of video, audio or picture type.

The existing storage devices allow mobility/portability of the content, so that the content is no longer only bound to the specific personal computer to which it was originally downloaded or received in another way.

However, the data stored are more vulnerable in the storage device than when they are stored in the personal computer. Indeed, the existing storage devices are generally deprived of content protection. Their small size further exposes them to risks of robbery. Accordingly, the content of the storage devices might be fraudulently copied or erased.

Further, the data stored in the storage devices tend to become more and more personal. Therefore, another concern with such storage devices is to ensure that only authorized users may access the data stored, and in particular that the access authorization be provided by the master user to which the storage device belongs.

There exist systems and methods widely implemented to protect content stored on external storage devices. These existing systems lie on complex processing of data and/or on complex identification infrastructure, such as password-based or biometrics identification infrastructures. Such approaches involve important costs and are reliant on user remembering passwords or identification information.

SUMMARY OF THE INVENTION

The present invention provides a system and method for content protection.

The system according to the invention comprises a system for content protection comprising a master storage device connectable to a mobile master memory unit associated with a memory unit identifier. The master storage device comprises: a protection key; storage means for storing files identified by respective file identifiers; and a processing unit comprising file encryption means for encrypting each file before storage in the storage means, using a title key computed from the protection key of the master storage device, and for encrypting the title key using the protection key of the master storage device and the identifier of the master memory unit. The master storage device is further provided to write the encrypted title key in association with the corresponding file identifier to the master memory unit.

The title key which is the original content encryption key according to the invention is never stored anywhere as such. It is generated once, in particular using a randomly generated number, for encrypting a given file received by the storage device. The title key is encrypted using parameters which are preferably burnt and protected, or computed. The resulting encrypted title key is stored on the master memory unit and will have to be subsequently decrypted for decryption of the corresponding encrypted file to allow an operation such as a playing operation on that file.

The present invention thus ensures protection of data stored on the storage device against unauthorized access and viewing, and unauthorized copy.

With the invention, the user only needs to be provided with at least two separate components, the mobile memory unit and the storage device, and to connect these components: initially, to enable encryption of the files (copy with encryption); and subsequently, to authorize decryption of the files for operation on the files, such as a playing operation.

The storage device according to the invention ensures encryption and decryption of data, without requiring that a computer be connected thereto. The invention thus provides a solution which is secure, reliable, personal, and easy-to-use. The invention obviates the need for passwords or identification sessions. The solution is based on security keys that can be temporarily lent to somebody else if the master user decides and agrees to do so.

Further, the solution of the invention is not entirely resident on a personal computer or on the storage device itself, but is split between different components, one of which is removable and mobile. The invention also makes it possible to use a same mobile memory unit to provide access to several storage devices or to transfer the security keys to a target memory unit.

Further advantages of the present invention will become clear to the skilled person upon examination of the drawings and detailed description. It is intended that any auxiliary advantages be incorporated herein.

BRIEF DESCRIPTION OF THE DRAWINGS

Embodiments of the present invention will now be described by way of non-limiting example with reference to the accompanying drawings in which like references denote similar elements.

The drawings are intended to depict only typical embodiments of the invention, and therefore should not be considered as limiting the scope of the invention.

DETAILED DESCRIPTION OF THE INVENTION

The detailed description is supplemented with an Exhibit E1 containing examples of equations used by the system and the method according to the invention. In the following description, references to Exhibit E1 are made directly using the Exhibit identifier "E1". Exhibit E1 is placed apart for the purpose of clarifying the detailed description, and of enabling easier reference. In Exhibit E1, some equations involves functions "encrypt(A,B)", "RSA_encrypt (A,B)", "decrypt (A,B)", and "RSA_decrypt(A,B)", each function having two parameters A and B, the first A representing the object that is to be encrypted or decrypted and the second B the key used for the encryption.

Figure 1:
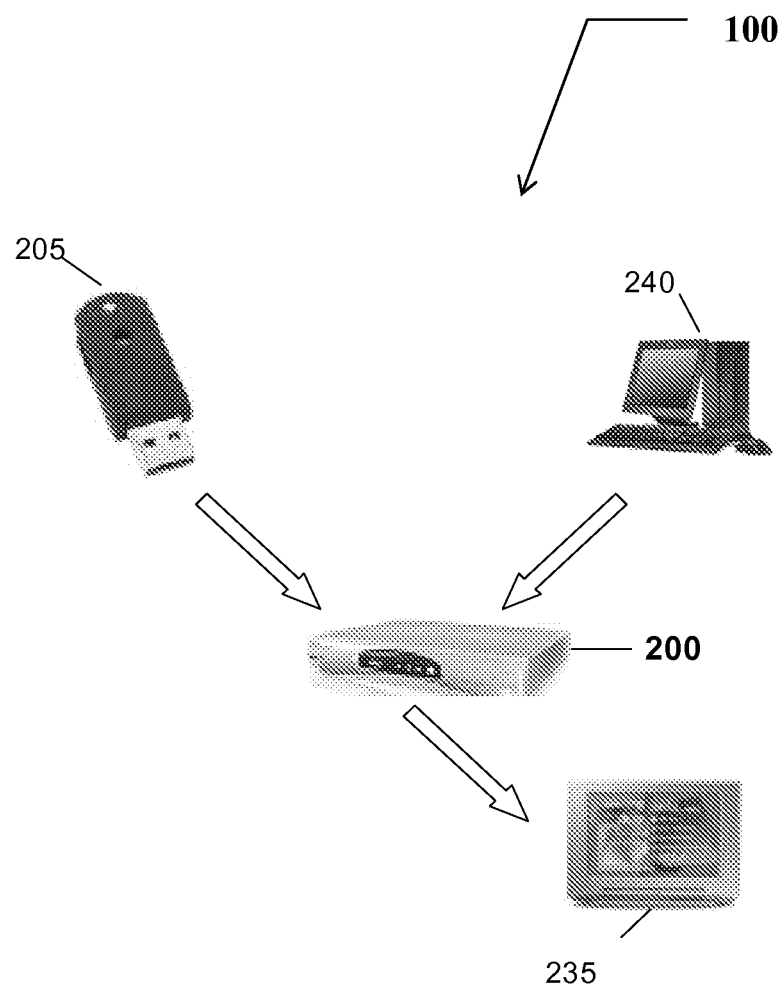
FIG. 1 shows a block diagram of a content protection system according to the invention.
Figure 2:
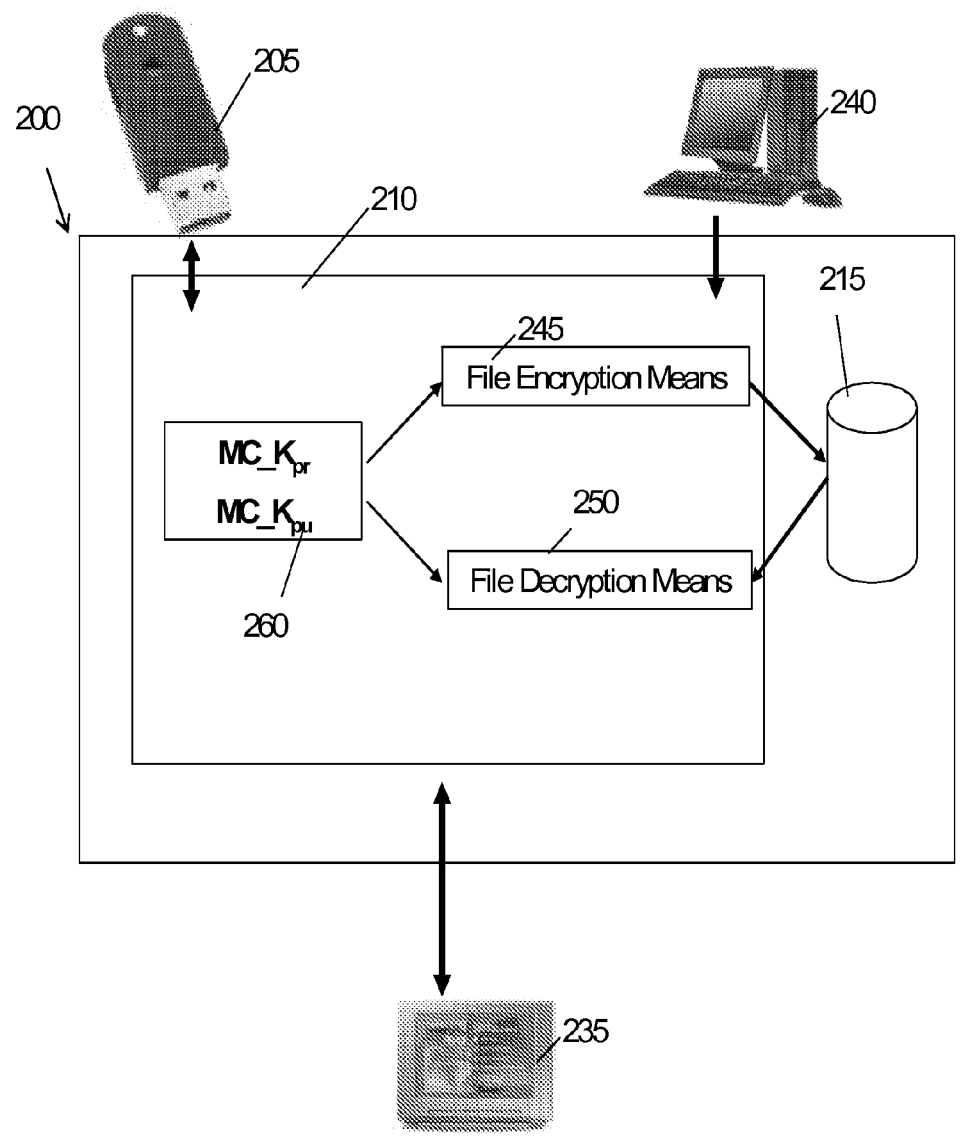
FIG. 2 is a block diagram showing the general architecture of a storage device according to the invention.

Reference is first made to FIG. 1 showing the general structure of a content protection system 100, in conjunction with FIG. 2 showing the structure of a media center, according to the invention.

The system 100 according to the invention comprises a storage device 200 having storage means 215 for storing files, for example audio, video or picture files. The storage device 200 includes devices of external hard disk type, but may also comprise logic functions such as playing/recording function. The following description will be made in reference to a storage device 200 capable of storing and playing video files, that will be referred hereinafter as a "media center", for illustrative purposes only.

The media center 200 has connection means for connection to a mobile memory unit 205 which will be referred below as a Mobile Securing Protection keyring or "MSP keyring". The MSP keyring may be any type of removable memory unit having storage capacity and being connectable to the media center through any suitable connection means, and in particular a memory unit of small size, which takes little place, such as a USB key as shown, or a SD card, so that a user may readily carry it with him at anytime.

FIG. 1 shows a MSP keyring 205 of the type USB directly connected to the media center 200 through a USB connector. However, one skilled in the art will understand that the MSP keyring 205 could be alternatively indirectly connected through a personal computer connected to the media center.

The system according to the invention makes it possible to split the protection information between the media center 200 and the removable MSP keyring 205, upon encryption of the files by the media center 200. The user will have to reconnect the same MSP keyring to the media center 200 for access or operation on the files. Thus, the MSP keyring 205 stores encryption information related to the file encrypted by the media center 200.

The MSP keyring 205 has an identifier Media_id which is attached thereto, in particular at manufacturing time. This identifier will be used to cryptographically bind the content encrypted by the media center 200 to the MSP keyring 205 in order to prevent fraudulent access or copying to other storage devices.

A personal computer 240 may be connected to the media center 200 for receiving commands from the user. It can be used for example for providing the non-encrypted files that are going to be securely transferred, encrypted and stored on the media center during an operation of the type "copy with encryption".

The media center 200 may be further provided with a scart plug for connection to a display such as a TV monitor 235 for video display, when the media center is of video/recorder type.

Referring to FIG. 2, the media center 200 comprises a processing unit 210 and storage means 215 for storing files, i.e., video files, received as an input. Prior to storing, the media center 200 ensures encryption of the input files according to the invention.

The processing unit 210 may be implemented as a hardware chip or in a software form. The description will be made with reference to a hardware implementation of the invention, for illustrative purposes only.

The media center 200 comprises keys 260, e.g., burnt to the hardware, including: a unique protection key MC_Kpr; this key may be a RSA private key, unreadable externally, used by the hardware secure chip. It is used to generate a title key during file encryption and to activate a transfer key for authorizing another user to access the files (license transfer); and a unique Identifier MC_Kpu identifying the media center.

This identifier may be a RSA public key readable externally. This key will be used to bind the media center 200 with a MSP keyring 205, and to encrypt a transfer key for authorizing another user to access the files (license transfer).

The processing unit 210 includes file encryption means 245 for encrypting the files received before storage in the storage means and file decryption means 250 for decrypting files from the storage means for which an operation such as a playing operation is required. In the hardware embodiment of the processing unit, the encryption and decryption means are included in the hardware.

The file encryption means 245 according to the invention uses a key named title key Kt, randomly generated, for encrypting each file. The files which are to be encrypted are each associated with a file identifier file_id identifying the file.

The file encryption means 245 are further adapted to encrypt the title key Kt using a hashing of the unique protection key MC_Kpr of the media center 200 concatenated with the identifier Media_Id of the MSP keyring 205, thereby providing an encrypted title key eKt.

According to a particular aspect of the invention, the unique key MC_Kpr of the media center 200 is burnt and not readable externally. The identifier Media_Id of the MSP keyring 205 is a unique identifier burnt at manufacturing time in the MSP keyring.

A couple of data including the file identifier file_id which has been encrypted and the encrypted title key eKt is then stored in a table structure provided in the MSP keyring 205.

After encryption of the file with the title key and storage of the encrypted title key eKt in association with the file identifier file_id, the processing unit may bind the MSP keyring 205 to the media center by storing the unique Identifier MC_Kpu of the media center 200, which is in particular a RSA public key, in the MSP keyring.

With the invention, the title keys Kt are never stored anywhere as such. Only the encrypted title keys eKt are stored on the MSP keyring 205. As regards the encrypted title keys eKt, they may be generated based on parameters that are not accessible by an unauthorized user (parameters burnt in the hardware), which allows to keep them secret and not readable outside the circuit. Therefore, fraudulent access to the files is limited.

The file decryption means 250 ensure that operation on an encrypted file stored on the media center 200 will be authorized only if the MSP keyring 205 which is connected thereto is the same MSP keyring that was used for encryption of the file.

According to an embodiment of the invention, the unique protection key MC_Kpr of the media center 200 is a RSA private key and the identifier of the media center 200 is a RSA public key MC_Kpu. The description below will be made with reference to such an RSA application.

Figure 3:
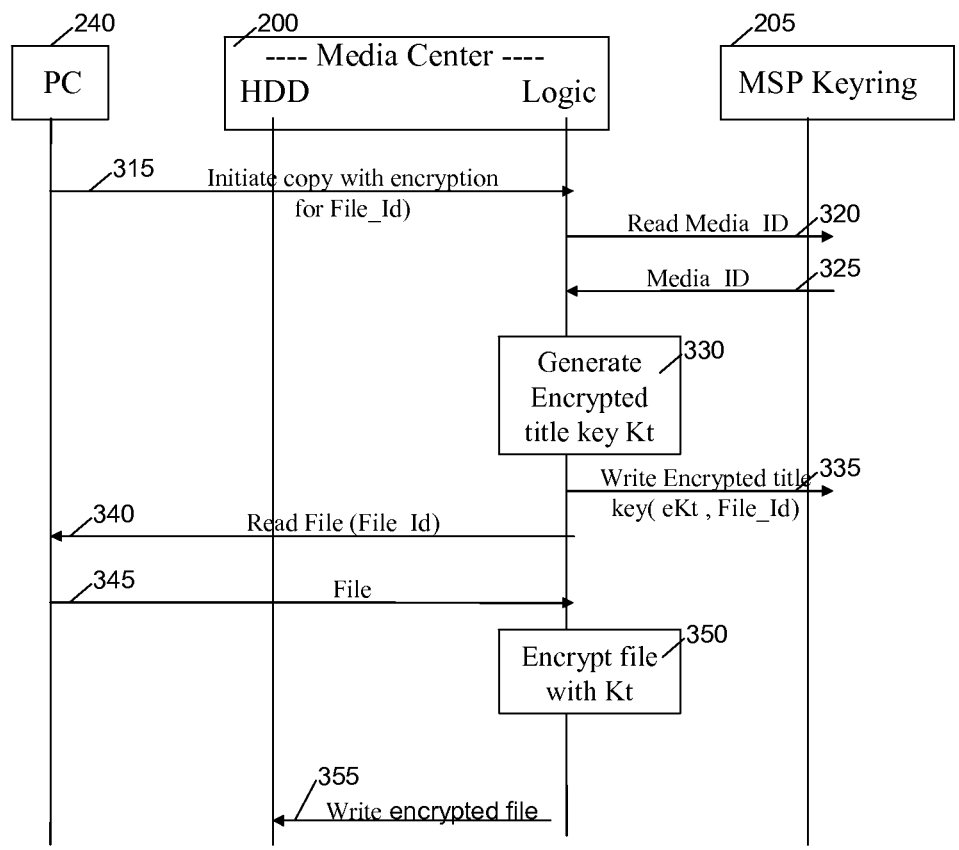
FIG. 3 illustrates the data exchanged to encrypt a file in a storage device, according to the invention.

The flowchart of FIG. 3 shows the steps performed to encrypt a file, according to the invention, before storage in the storage means 215.

At step 315, the media center 200 receives a request for initiating encryption and copy of a given file, e.g., a video file identified by a file identifier file_id. The request may be received for instance from the personal computer 240 connected to the media center 200.

The media center checks whether a Mobile Secure and Protection keyring 205 is connected to the media center 200, either directly or indirectly, and if so performs the following steps.

At steps 320 and 325, the media center initiates to the MSP keyring 205 a request for reading the unique identifier Media_Id of the MSP Keyring 205. The returned value Media_ID is used to initialize a local variable with the same name.

At step 330, the media center 200 generates a random title key Kt using the unique protection key of the media center MC_Kpr, which is in particular burnt in the media center hardware and unreadable.

To generate the title key Kt, the media center uses a hashing of the protection key MC_Kpr concatenated with a locally computed random number Rnd( ), as defined by equation (1) of Exhibit E1.

The file encryption means 245 will use the title key Kt to encrypt the file identified by the file_id.

The file encryption means 245 then encrypt the title key using the identifier Media_Id of the MSP keyring 205, and the protection key MC_Kpr of the media center 200, which provides an encrypted title key eKt. The encrypted title key is obtained with a hashing of the identifier Media_ID of the MSP keyring 205 concatenated with the protection key MC_Kpr, as defined by equation (2) of Exhibit E1.

The hashing function may for instance lie on an algorithm such as the Message-Digest Algorithm MD5, or Secure Hash Algorithm SHA. In the following description, the world "hashing" will be used with a similar definition.

At step 335, the Encrypted title key eKt thus obtained is written to the MSP keyring 205, in association with the corresponding file identifier File_id.

This couple of data (ekt, File_Id) forms with the MSP keyring hardware, a license key that will later makes it possible to access the file identified by file_id, for example for a recording/copying with encryption operation, as shown at steps 340 and 345.

At step 350, the file encryption means then encrypt the file using the title key Kt previously calculated. Before encryption, the file identified by the file identifier file_id is read from the personal computer. The encryption file is finally stored on the storage unit 215 at step 355.

Figure 4:
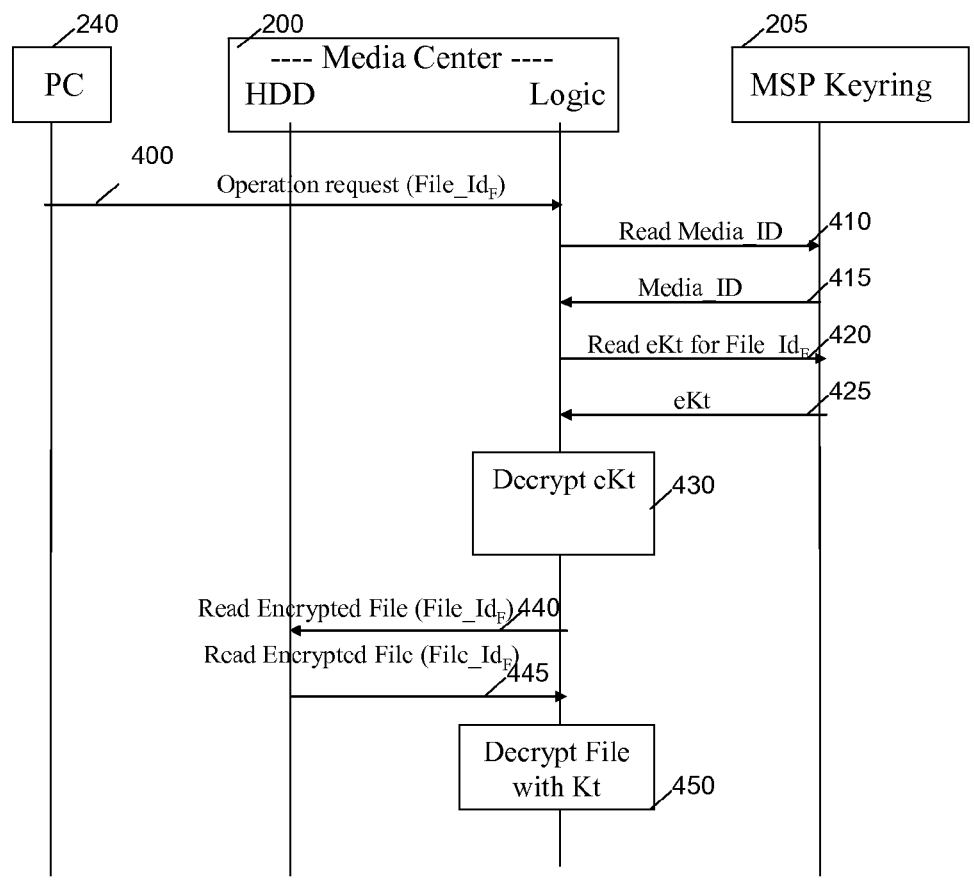
FIG. 4 illustrates the data exchanged to allow an operation on an encrypted file, according to the invention.

FIG. 4 shows the steps performed by the media center 200 to retrieve an encrypted file from the storage means 215, for example when an operation on the file, such as a playing operation when the file is of a video type, is requested.

At step 400, an operation request related to a given file F identified by a file identifier file_id$_F$ is received by the media center 200. This request may be transmitted to the media center by a user through any means such as I/R remote control, a connected PC, etc.

The media center 200 checks whether an MSP keyring 205 is inserted, and if not requests its insertion, e.g., by displaying a message on display 235.

At step 410, the media center reads the unique Identifier Media_Id of the MSP keyring 205. The returned value is used to initialize a local variable with the same name at step 415.

At step 420, the media center 200 then reads from the MSP keyring 205 the encrypted title key eKt associated with the identifier file_id$_F$ of file F. The returned encrypted title key eKt is used to initialize a local variable with the same name at step 425.

At step 430, the media center 200 then decrypts eKt using the identifier Media_id of the MSP keyring 205 and the unique protection key MC_K$_{pr}$ of the media center to provide a title key Kt. More specifically, eKt is decrypted using a hashing of the identifier Media_Id of the MSP keyring concatenated with the protection key MC_K$_{pr}$, as defined by equation (3) of Exhibit E1.

At step 440, the encrypted file F is retrieved from the storage means 215 of the media center 200. The returned value is used to initialize a local variable with the same name at step 445.

At step 450, File F is decrypted using the title key Kt obtained at step 430, and then the requested operation is performed.

Figure 5A:
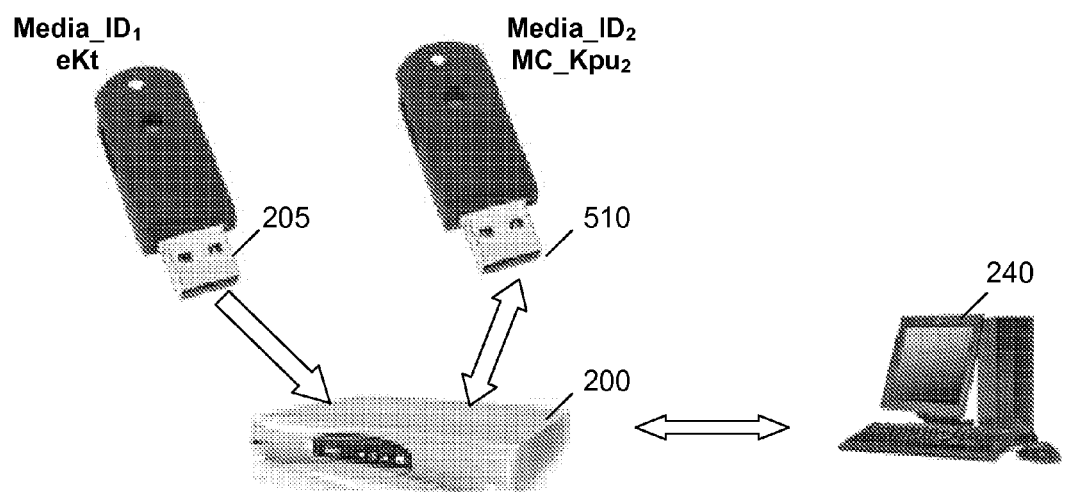
FIG. 5A shows the structure of the system according to the invention for transferring licenses from a master MSP keyring to a target MSP keyring.

Reference is now made to FIG. 5A showing the structure of the system for transfer of "licenses" from a master MSP keyring 205 to a target MSP keyring 510, according to the invention. The master MSP keyring 205 is bound to the media center 200, and therefore contains encrypted title keys eKt in association with respective file identifiers identifying files which have been encrypted by the media center 200, as previously described in reference to FIG. 4.

Here, the word "license" should be understood as designating a transfer key TeKt (also called below "temporary title key") for a given file, derived from the encrypted title key eKt associated with this file in the master MSP keyring 205. This transfer key TeKt will be computed by the media center 200 and then stored to the target MSP keyring 510 in order to allow a target user equipped with the target MSP keyring 510 to generate in turn a specific key eKt in association with the file.

The media center 200 (master media center) generates the licenses either for use on the same media center 200, for example in situations where several users provided with different MSP keyrings may need access to files stored in the same media center 200, or for use on a target media center 500 with a different MSP keyring 510, the target media center storing copies of the files encrypted by the master media center 200.

Figure 5B:
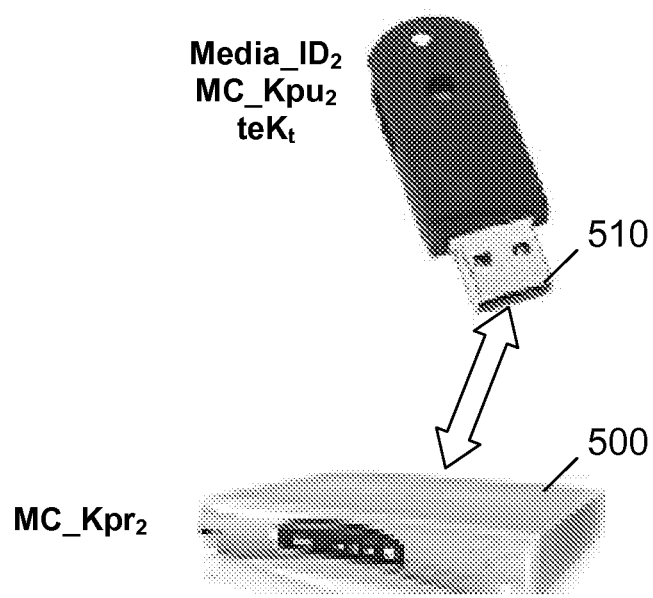
FIG. 5B shows the structure of the system according to the invention to activate a transfer key at a target storage device.

FIG. 5A shows the structure of the system in a first phase of the license transfer, while FIG. 5B shows a second phase of the license transfer. FIG. 5B relates to the exemplary embodiment where the target MSP keyring 510 is different from the master MSP keyring 205.

During the first phase, the temporary title keys are transferred from the master MSP keyring 205 to the target MSP keyring 510.

In the second phase, the target MSP keyring 510 will be connected to the target media center, which may correspond to a distinct media center 500 or to the master media center itself 200.

When the target media center is a distinct media center 500, the encrypted files corresponding to the temporary title keys (licenses) transferred to the target MSP keyring 510 will have to be previously copied to storage means provided in the target media center 500.

The master MSP keyring 205 stores the encrypted title keys eKt which were generated during encryption of the files stored in the storage means 215 of the media center 200.

During the first phase illustrated at FIG. 5A, the master MSP keyring 205 containing the encrypted title keys in association with respective file identifiers, and the target MSP keyring 510, to which encrypted title keys have to be copied or transferred to, are both required to be connected to the master media center 200.

Depending on the type of the master media center, the user could also use a personal computer 240 connected to the media center 200 to request transfer of licenses for a set of encrypted files.

The target MSP keyring 510 stores the identifier $MC\_Kpu_2$ of the target media center 500 (whether another media center or the same media center as master media center 200), which indicates that the target MSP keyring 510 is bound to that target media center. Thus, the licenses will be delivered to the target MSP keyring only for use with this target media center 500.

Figure 6:
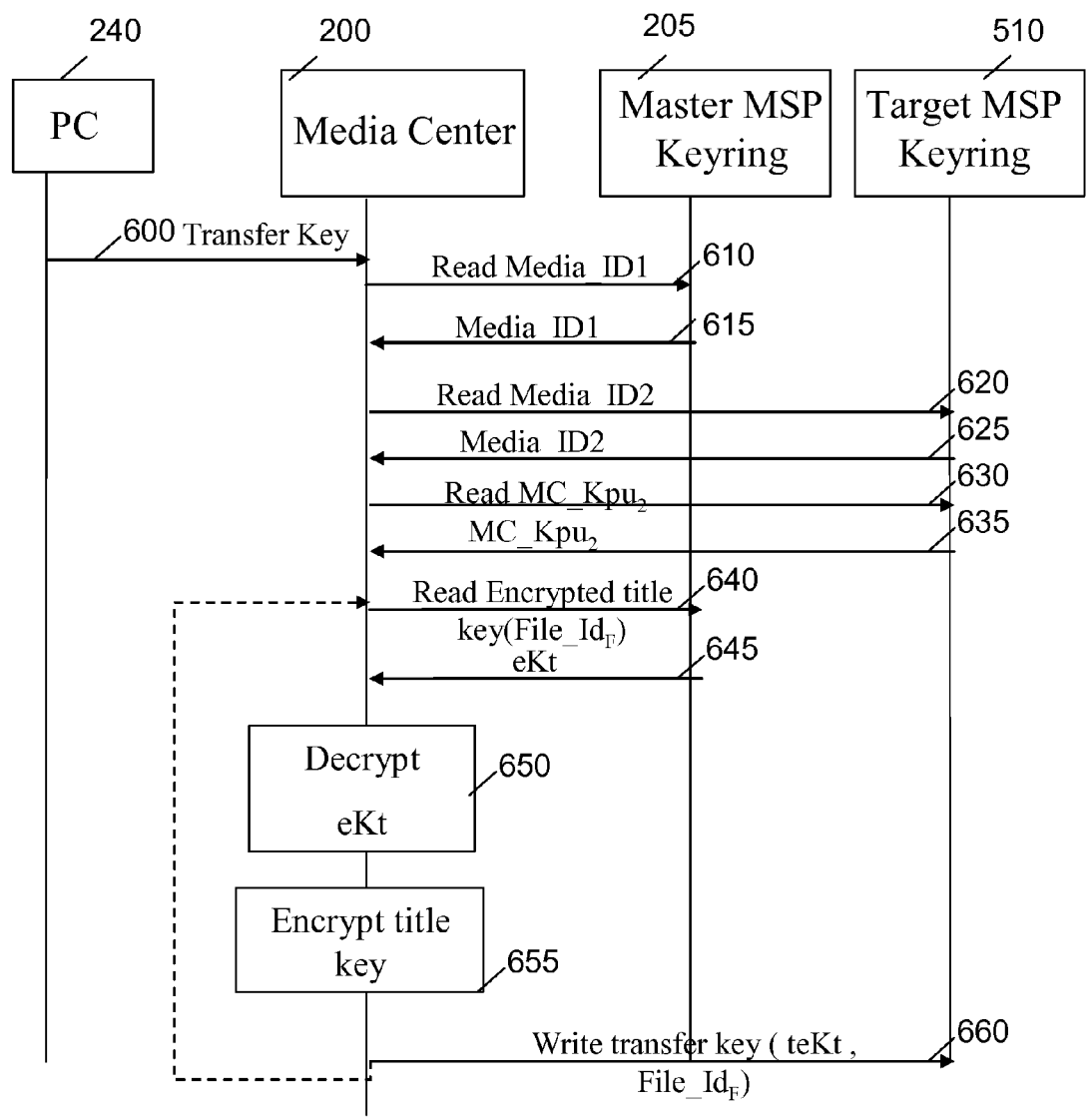
FIG. 6 illustrates the data exchanged to transfer an encrypted title key from a master MSP keyring to a target MSP keyring.

Reference is now made to FIG. 6 showing the steps performed for transferring licenses from the master MSP keyring 205 to the target MSP keyring 510, at the first phase.

At step 600, a request for transfer of licenses corresponding to selected encrypted files, identified by file identifiers file_id, is received by the master media center 200, for example through the personal computer 240.

The master MSP keyring 205 contains the encrypted title keys eKt which were generated during the encryption of the selected files.

The target MSP keyring 510 stores the unique identifier $MC\_Kpu_2$ of the target media center 500, whereby the target MSP keyring is bound to that specific target media center 500.

At step 610, the media center 200 reads the unique identifier $Media\_D_1$ of the master MSP keyring 205 and initializes a local variable with the same name at step 615.

At step 620, the media center 200 reads the unique media identifier $Media\_ID_2$ of the target MSP keyring 510, and then initializes a local variable with the same name at step 625.

At step 630, the media center 200 reads the identifier $MC\_K_{pu2}$ of the target media center 500 (another media center or the media center itself) to which the target MSP keyring has been bound and initializes a variable with the same name at step 635.

For each selected file F, identified by a file identifier file_id associated with an encrypted key eKt in the master MSP keyring 205, the media center 200 generates a license in the form of a temporary title key (transfer key) TeKt, at steps 640 to 660.

More specifically, at step 640, the master media center 200 reads the encrypted title key eKt corresponding to a given selected file F identified by a file identifier $File\_Id_F$ from the master MSP Keyring 205 and generates a local variable with the same name at step 645.

At step 650, this encrypted title key eKt is first decrypted using the unique protection key MC_Kpr1 of the media center 200 and the identifier Media_ID1 of the master MSP keyring 205, which provides a title key Kt. More specifically, the encrypted title key eKt is decrypted using a hashing of the identifier Media_ID1 of the master MSP keyring 205 concatenated with the unique protection key MC_Kpr1 of the media center 200, as defined by equation (4) of Exhibit E1. The master media center 200 then checks whether the master MSP keyring 205 is the same MSP keyring than the one that was used to generate the title keys, during encryption of the files. This checking phase lies on the fact that each title key Kt was initially computed at step 330 of FIG. 3 as a concatenation of a random number RND( ) with the lowest bits (in particular 64 bits) resulting from a hashing of the protection key $MC\_K_{pr}$, as defined by equation (1) of Exhibit E1.

Thus, when a license transfer is started, the media center 200 checks whether the 64 lowest bits of the title key Kt match the hashing of the protection key MC_Kpr of the media center 200. If not, the transfer of the title key will not be performed.

This phase ensures protection against unauthorized copy since the transfer of a temporary encrypted title key TeKt from the master MSP keyring 205 to a the target MSP keyring 510 is only authorized, if the first media center from which the transfer key is to be transferred corresponds to the media center that was used to calculate the title key Kt.

At step 655, the title key Kt thus obtained is: encrypted a first time using the identifier Media_Id2 of the target MSP keyring 510, and in particular a hashing of the identifier Media_id2; and encrypted a second time using the identifier $MC\_K_{pu2}$ of the target media center 500 to which the target MSP keyring has been bound, which provides a temporary title key teKt, as defined by the equation (5) of Exhibit E1.

According to an embodiment of the invention the protection key of each media center MC_Kpu is a public RSA key and the identifier of each media center MC_Kpr is a private RSA key. In such embodiment, the second encryption of the title key Kt is of RSA type (function RSA_encrypt).

At step 660, the temporary encrypted title key Tekt constituting the license for file F is then written to the target MSP keyring 510 in association with the file identifier file_IDF of file F.

Steps 640 to 660 are repeated for all selected files until all licenses have been transferred.

The couple of information (teKt, file_id) will be stored in a table structure provided in the target MSP keyring 510.

At the second phase of the license transfer, as illustrated in FIG. 5B, a user equipped with the target MSP keyring 510 will then be able to make operations on the licensed files, such as a playing operation.

However, the temporary title keys are not usable as such by the target media center 500. An activation phase is required to allow the user to effectively access the licensed files.

The target media center 500 is accordingly provided with activation means for activating the temporary title keys. The activation of temporary title keys requires that the target MSP keyring 510 be connected to the target media center 500 to which it is bound. More specifically, the activation means are provided to generate an active encrypted title key ekt bound both to the target MSP keyring 510 and to the target media center 500, from each temporary title key TeKt stored in the target MSP keyring 510.

The activation phase may be triggered by the connection of the target MSP keyring 510 to the target media center 500 or alternatively when a given temporary title key has to be used for an operation on the associated file.

Figure 7:
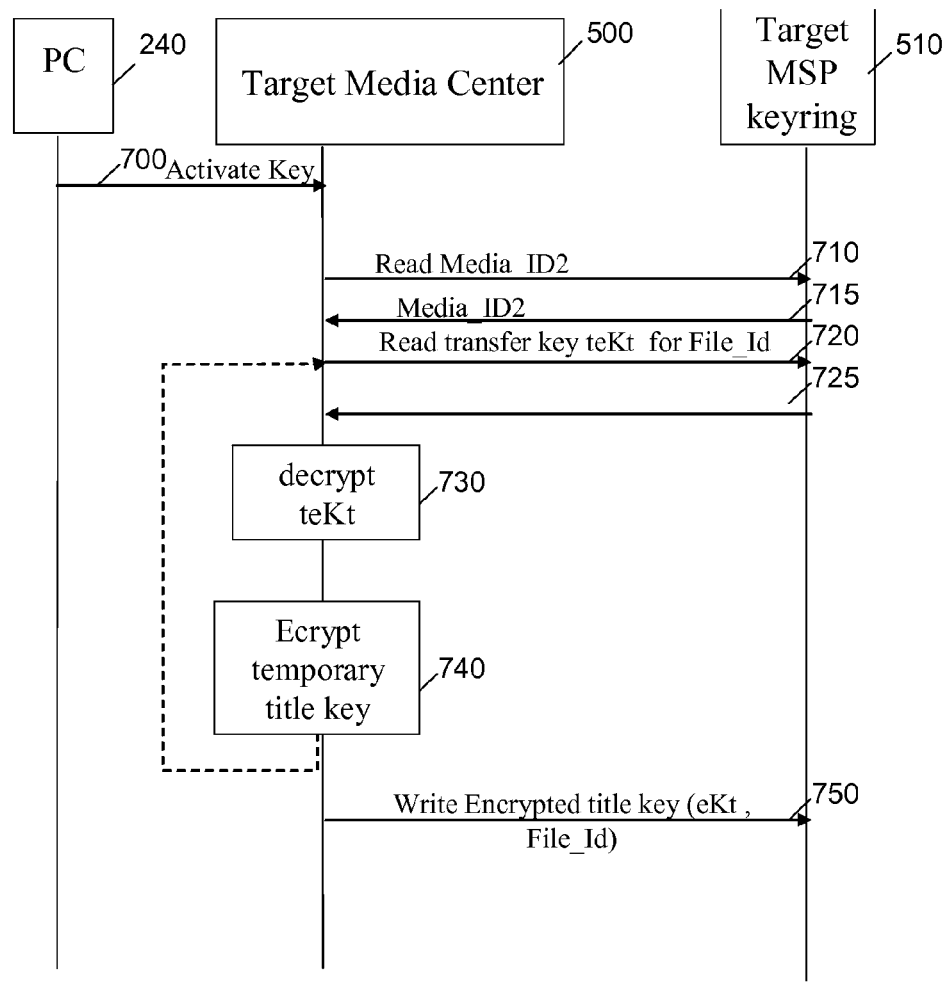
FIG. 7 illustrates the data exchanged to activate a transfer key at a target storage device.

Reference is now made to FIG. 7 illustrating the steps performed to activate a temporary title key, according to the invention.

At step 700, the activation phase is started in response to the connection of the target MSP keyring 510 to the target media center 500 for each licensed file associated with a temporary title key Tekt in the target MSP keyring 510. Alternatively, the activation phase could be started for each temporary title key, when a user requests an operation on the corresponding licensed file.

At step 710, the target media center 500 reads from the target MSP keyring 510 the unique identifier $Media\_ID_2$ of the target MSP keyring 510 and initializes a local variable with the returned value at step 715.

At step 720, the target media center 500 reads from the target MSP keyring 510 the temporary title key Tekt associated with the file identifier File_Id of the licensed file, and initializes a local variable with the same name at step 725.

At step 730, the target media center 500 decrypts the temporary title key TeKt using a first decryption function, and the unique protection key MC_$K_{pr2}$ of the target media center 500, and then a second decryption function using the identifier Media_ID2 of the target MSP keyring 510, and in particular a hashing of Media_Id2, which gives a title key Kt. In the embodiment where the unique protection key MC_$K_{pr2}$ of the target media center 500 is a private RSA key, the second decryption function if of RSA type (RSA_encrypt). The title key Kt thus obtained is defined by equation (6) of Exhibit E1.

At step 740, the title key Kt is then re-encrypted using the protection key MC_Kpr2 of the target media center 500 and the identifier Media_ID2 of the target MSP keyring 510. In particular, this re-encryption uses a hashing of Media_ID2 concatenated with the protection key MC_Kpr2 of the target media center 500, which provides an encrypted key eKt forming the activated encrypted key as defined by equation (7) of Exhibit E1. At step 750, the activated encrypted key eKt is written to the target MSP keyring 510 in association with the file identifier file_id of the licensed file, and in particular in replacement of the temporary title key.

Steps 710 to 750 are repeated for all the temporary title keys TeKt stored in the target MSP keyring 510, in the embodiment where the activation means proceed all the temporary title keys at the connection of the target MSP keyring 510, or alternatively are repeated only for the licensed files for which the operation is requested.

Figure 8:
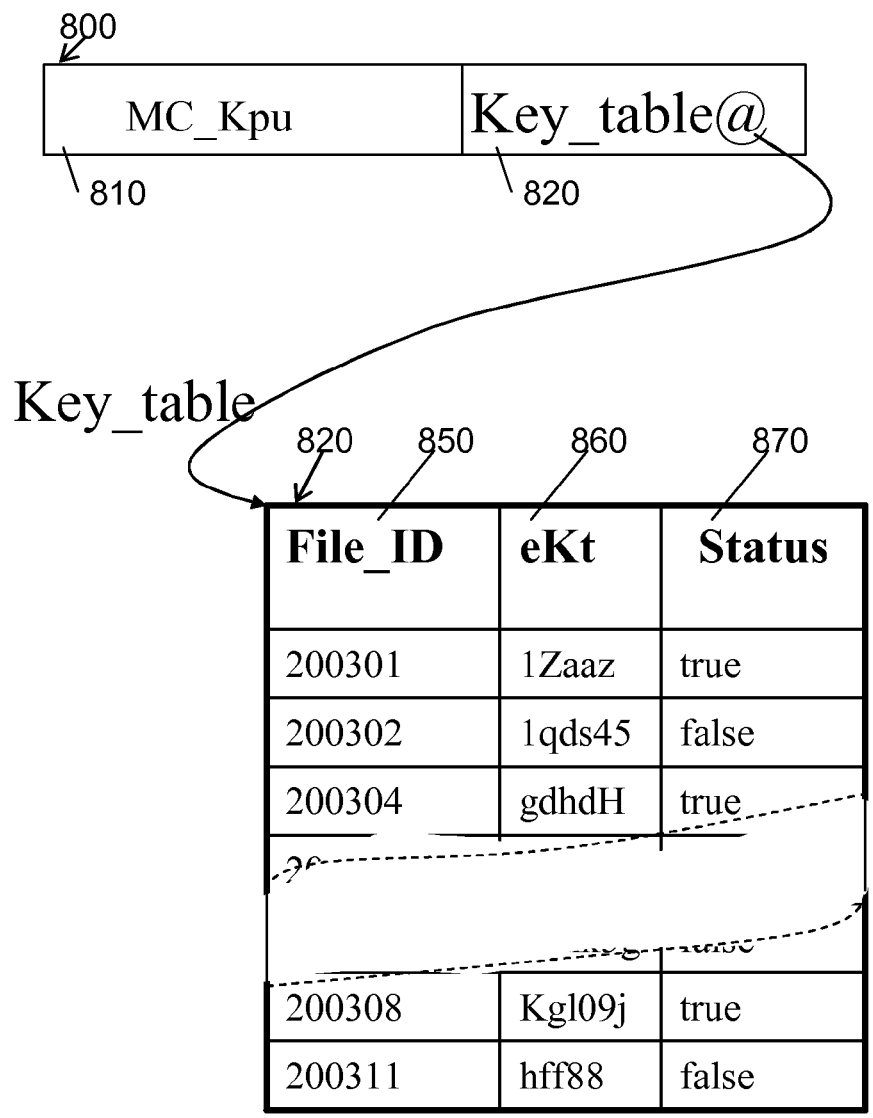
FIG. 8 shows an exemplary structure of the mobile memory unit according to the invention.

Reference in now made to FIG. 8 which shows an exemplary structure of a MSP keyring for binding to a unique media center.

A MSP table 800 is provided in the MSP keyring which associates the identifier MC_Kpu of the media center (RSA public key) 810 with a pointer key_table@ to a key table 820.

The Key table 820 is thus specific to the media center and stores the generated encrypted title keys 860 (second column) in association with a file identifier 850 (first column) identifying a file stored in the storage means of the media center and with a status 870 (third column).

The file identifier could be for instance the name of a video file with or without the complete path, or any other identifier.

The status of the encrypted title key has at least two possible values, for instance a "true" or "false" value. The first value (e.g., "True") of the status designates an active encrypted title key eKt. An active encrypted key eKt can be used as such to decrypt the associated file. Conversely, the second value (e.g., "False") for the status designates a temporary title key TeKt. If this status information indicates that the key is a temporary title key, the key will have to be activated by the activation means as described above.

Figure 9:
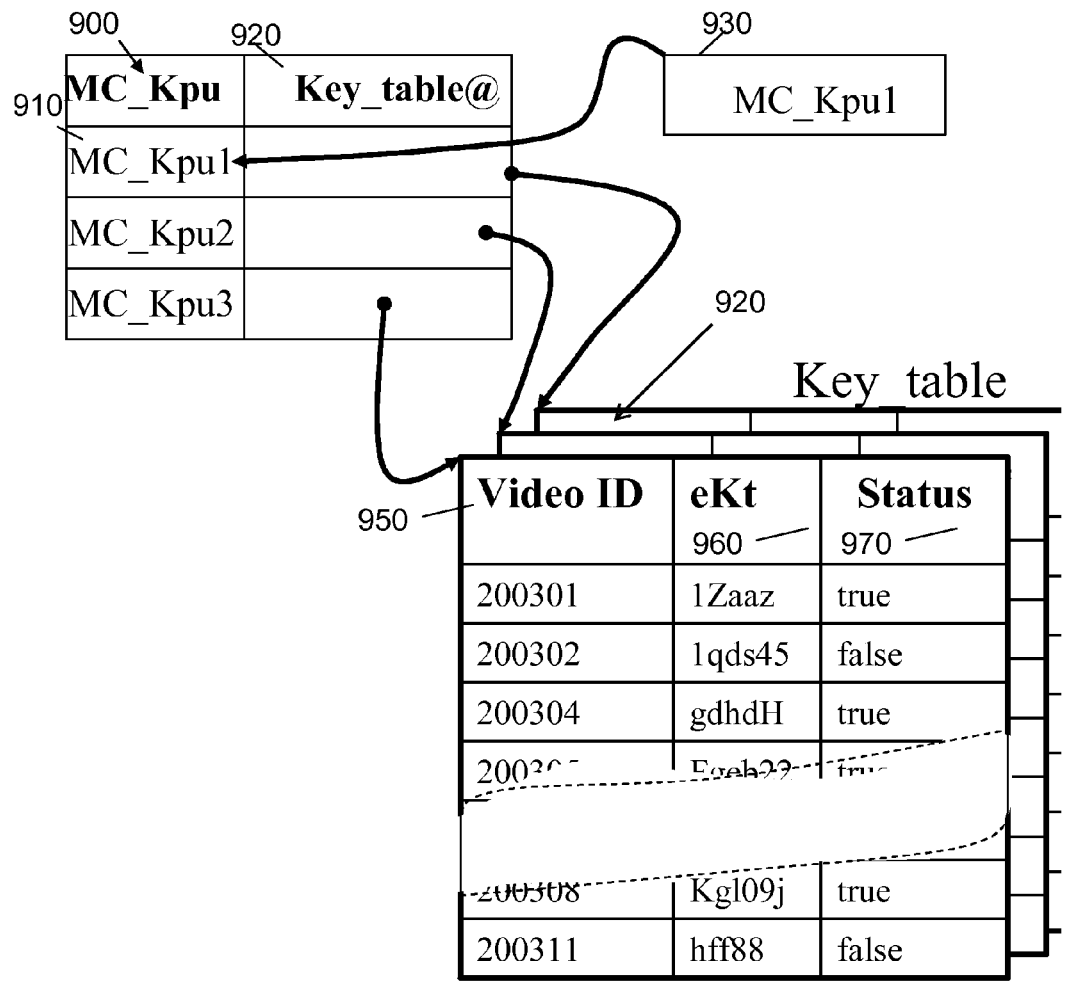
FIG. 9 shows an alternative structure of the mobile memory unit according to the invention.

FIG. 9 shows an alternative structure of a MSP keyring for binding to several media centers.

The MSP keyring comprises a MSP table 900 which associates identifiers MC_$Kpu_n$ of media centers (in particular RSA public keys) in a column 910 with respective pointers Key_table@ towards key tables 920.

A special register 930 is provided in the MSP keyring to link the MSP keyring to a specific media center. This register 930 includes the identifier MC_Kpu of this specific media center. The specific media center corresponds to the media center to which the MSP keyring is currently connected and has therefore the same value as one of the media identifiers included in 910. The other media center identifiers of column 910 designate media centers to which the MSP keyring is connectable (media centers to which the MSP keyring has been bound).

Each Key table 920 is thus specific to a particular media center and stores the generated encrypted title keys in association with a file identifier 950 identifying a file stored in the particular media center. The file identifier could be for instance the name of a video file with or without the complete path, or any other identifier.

Each key table has the same structure as the key table 820 described in reference to FIG. 8.

The present invention thus makes it possible to protect content stored in the storage means 215 against unauthorized access, and unauthorized copy, in a transparent manner.

Indeed, all the functions used to encrypt or decrypt a title key are in particular part of the hardware. Further, the title key as such is not stored anywhere, which makes it not accessible by an unauthorized or fraudulent user.

The solution provided by the invention does not require manipulation of passwords, or identification.

A user is automatically identified when connecting its MSP keyring.

The media center 200 both ensures files encryption and decryption, without requiring that a personal computer be connected.

The title key used for encryption of the files is never stored anywhere as is, and therefore is not accessible to fraudulent users.

Further, the delivery of a license in the form of a key transfer does not require a lot of time, and may be achieved at the master storage device, in a very simple manner. Temporary title keys cannot be transferred using a media center which has not been used to calculate the original title key.

Each media center has it own unique key generated by manufacturer and do not require unlike conventional systems that the unique key be acquired through a managing entity by paying license.

Further, in an embodiment of the invention, the unique key MC_Kpr of the media center 200 is burnt in the hardware and therefore not readable externally.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. For example, one skilled in the art will understand that the MSP table shown in FIG. 9 is for exemplary purposes only, and that other types of MSP tables of different structures could be used alternatively. For example, same keys could be used for several media centers hosting different sets of encrypted files.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

Exhibit E1

$$K_t = Rnd(\ ) \| \text{Hash}(MC\_K_{pr}) \quad (1)$$

$$eK_t = \text{encrypt}(K_t, \text{Hash}(Media\_ID \| MC\_K_{pr})) \quad (2)$$

$$K_t = \text{decrypt}(eK_t, \text{Hash}(Media\_ID \| MC\_K_{pr})) \quad (3)$$

$$K_t = \text{decrypt}(eK_t, \text{Hash}(Media\_ID \| MC\_K_{pr1})) \quad (4)$$

$$teK_t = \text{RSA\_encrypt}(\text{encrypt}(K_t, \text{Hash}(Media\_ID_2)), MC\_K_{pu2}) \quad (5)$$

$$K_t = \text{decrypt}(RSA\_\text{decrypt}(teK_t, MC\_K_{pr2}), \text{Hash}(Media\_ID_2)) \quad (6)$$

$$eK_t = \text{encrypt}(K_t, \text{Hash}(Media\_ID_2 \| MC\_K_{pr2})) \quad (7)$$

The invention claimed is:

1. A system for content protection, comprising:
a master storage device;
a mobile master memory unit having a memory unit identifier and removably connectable to the master storage device,
wherein the master storage device comprises:
   a unique protection key (MC_Kpr);
   storage for storing files identified by respective file identifiers; and
   a processing unit comprising:
      a file encryption component for encrypting each file before storage in the storage, using a title key (Kt) computed from the protection key of the master storage device, and for encrypting the title key using a hashing of the memory unit identifier of the mobile master memory unit concatenated with the protection key (MC_Kpr) of the master storage device;
   the master storage device being further provided to write the encrypted title key (eKt) in association with the file identifier of the file to the mobile master memory unit.

2. The system of claim 1, wherein the title key is computed from a randomly generated number concatenated with a hashing of the protection key (MC_Kpr) of the master storage device.

3. The system as claimed in claim 1, wherein the processing unit further comprises a file decryption component for decrypting a given encrypted file retrieved from the storage using the encrypted title key (eKt), associated with the file identifier identifying the given file, retrieved from the mobile master memory unit.

4. The system of claim 3, wherein the file decryption component decrypts the encrypted title key from the identifier of the mobile master memory unit and the protection key of the master storage device, which provides a title key, the encrypted file being then decrypted using the title key.

5. The system of claim 4, wherein the encrypted title key is decrypted using a hashing of the memory unit identifier of the mobile master memory unit concatenated with the protection key (MC_Kpr) of the master storage device.

6. The system of claim 1, wherein the protection key is provided in the master storage device so as to be externally unreadable.

7. The system of claim 1, wherein the master storage device writes each encrypted title key in association with the file identifier to a key table provided in the mobile master memory unit.

8. The system of claim 1, wherein the master storage device has a device identifier identifying the master storage device, the master storage device being provided to further write the identifier to the mobile master memory unit, upon encryption of the files.

9. The system of claim 8, wherein the identifier of the master storage device is a RSA public key externally readable, and the protection key of the master storage device is a RSA private key.

10. The system according to claim 1, wherein the master storage device is further connectable to a mobile target memory unit identified by a memory unit identifier and storing an identifier (Kpu2) identifying a target storage device, the processing unit of the master storage device further comprising a control component for generating a transfer key for a selected file among the encrypted files stored in the storage of the master storage device, and for writing the transfer key to the mobile target memory unit, in association with the corresponding file identifier, wherein the control component comprises:
   a reading function for reading from the mobile master memory unit the encrypted title key (eKt) associated with the file identifier identifying the selected file;
   a decryption function for decrypting the encrypted title key, using the identifier of the mobile master memory unit and the protection key (MC_Kpr1) of the master storage device, which provides an intermediary title key (Kt);
   a first encryption function for encrypting the intermediary title key using the identifier of the mobile target memory unit; and
   a second encryption function for encrypting the key provided by the first encryption function, using the identifier (Kpu2) of the target storage device stored by the mobile target memory unit, which provides the transfer key (teKt).

11. The system of claim 10, wherein the decryption function is provided to decrypt the encrypted title key using a hashing of the memory unit identifier of the mobile master memory unit concatenated with the protection key (MC_Kpr) of the master storage device.

12. The system of claim 10, wherein the first encryption function is provided to encrypt the intermediary title key using a hashing of the identifier of the mobile target memory unit.

13. The system of claim 10, wherein the identifier of the target storage device stored in the mobile target memory unit is a RSA public key, the second encryption function being based on a RSA encryption.

14. The system of claim 10, wherein the master storage device copies a selected encrypted file to the target storage device, and wherein the target storage device is connectable to the mobile target memory unit, and comprises:
   a protection key;
   a target storage storing encrypted files copied from the master storage device; and
   a target processing unit including a file decryption component based on RSA private key encryption for decrypting an encrypted file retrieved from the target storage, the file decryption component being adapted to check whether a transfer key associated with a file identifier identifying the encrypted file is stored on the mobile target memory unit, and if so for decrypting the encrypted file using an activated key determined from the transfer key.

15. The system of claim 14, wherein the activated key is determined using:
   a first decryption function based on RSA private key decryption for decrypting the transfer key using a protection key (MC_Kpr2) of the target storage device, which provides a first key;
   a second decryption function for decrypting the first key using the identifier of the mobile target memory unit, which provides a second key;
   an encryption function for encrypting the second key, using the identifier (media_id2) of the mobile target memory unit and the protection key (MC_Kpr2) of the target storage device, which provides the activated key; and the target storage device being further adapted to write the activated key over the transfer key in the mobile target memory unit, in association with the corresponding file identifier.

16. The system of claim 15, wherein the protection key attached to the target storage device is a RSA private key, unreadable externally, the first decryption function being of RSA decryption type.

17. The system of claim 15, wherein the second decryption function uses a hashing of the identifier of the mobile target memory unit.

18. The system of claim 15, wherein the encryption function of uses a hashing of the identifier of the mobile target memory unit concatenated with the protection key of the target storage device.

19. A method for content protection, the method comprising:

providing a master storage device comprising storage for storing files identified with respective file identifiers, the master storage device being provided with a unique protection key;

connecting at least one mobile master memory unit associated with a memory unit identifier to the master storage device;

in response to a reception of a file to be stored in the storage, encrypting the file, using an encrypted title key (eKt) computed from a hashing of the memory unit identifier of the mobile master memory unit concatenated with the protection key (MC_Kpr) of the master storage device;

writing the encrypted title key in association with the file identifier of the file to the mobile master memory unit; and storing the encrypted files in the storage.

20. The method of claim 19, further comprising:

connecting a mobile target memory unit identified by a memory unit identifier (media_id2) to the master storage device, the mobile target memory unit storing a device identifier (Kpu2) of a target storage device;

generating a transfer key for a selected file among the encrypted files stored in the storage of the storage device;

writing the transfer key to the mobile target memory unit, in association with the corresponding file identifier;

reading from the mobile master memory unit the encrypted title key (eKt) associated with the file identifier identifying the selected file;

decrypting the encrypted title key, using the identifier of the mobile master memory unit and the protection key (MC_Kpr1) of the master storage device, which provides an intermediary title key (Kt);

encrypting the intermediary title key using the identifier of the mobile target memory unit; and encrypting the intermediary title key using the identifier (Kpu2) of the target storage device stored by the mobile target memory unit, which provides the transfer key (teKt).

21. The method of claim 20, further comprising:

activating a transfer key, in response to a connection of the mobile target unit to the target storage device, the activation comprising:

decrypting the transfer key using a protection key (MC_Kpr2) of the target storage device, which provides a first key;

decrypting the first key using the identifier of the mobile target memory unit, which provides a second key;

encrypting the second key, using the identifier (media_id2) of the mobile target memory unit and the protection key (MC_Kpr2) of the target storage device, which provides the activated key; and writing the activated key over the transfer key in the mobile target memory unit, in association with the corresponding file identifier.

* * * * *